United States Patent
Borella et al.

(10) Patent No.: US 6,708,219 B1
(45) Date of Patent: Mar. 16, 2004

(54) METHOD AND SYSTEM FOR DUAL-NETWORK ADDRESS UTILIZATION

(75) Inventors: Michael S. Borella, Naperville, IL (US); David Grabelsky, Skokie, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/426,614

(22) Filed: Oct. 26, 1999

(51) Int. Cl.[7] .............................................. G06F 15/16
(52) U.S. Cl. ...................... 709/245; 709/246; 709/230
(58) Field of Search ................................. 709/245, 246, 709/228, 230; 340/3.5, 3.53, 3.54; 370/389, 392, 393, 400

(56) References Cited

U.S. PATENT DOCUMENTS

| | | |
|---|---|---|
| 4,953,198 A | 8/1990 | Daly et al. |
| 5,159,592 A | 10/1992 | Perkins |
| 5,227,778 A | 7/1993 | Vacon et al. |
| 5,327,365 A | 7/1994 | Fujisaki et al. |
| 5,497,339 A | 3/1996 | Bernard |
| 5,526,353 A | 6/1996 | Henley et al. |
| 5,526,489 A | 6/1996 | Nilakantan et al. |
| 5,550,984 A | 8/1996 | Gelb |
| 5,604,737 A | 2/1997 | Iwami et al. |
| 5,606,594 A | 2/1997 | Register et al. |
| 5,636,216 A | 6/1997 | Fox et al. |
| 5,654,957 A | 8/1997 | Koyama |
| 5,708,655 A | 1/1998 | Toth et al. |
| 5,737,333 A | 4/1998 | Civanlar et al. |
| 5,742,596 A | 4/1998 | Baratz et al. |
| 5,754,547 A | 5/1998 | Nakazawa |
| 5,793,657 A | 8/1998 | Nemoto |
| 5,793,763 A | 8/1998 | Mayes et al. |
| 5,812,819 A | 9/1998 | Rodwin et al. |
| 5,835,723 A | 11/1998 | Andrews et al. |

(List continued on next page.)

FOREIGN PATENT DOCUMENTS

| | | | |
|---|---|---|---|
| EP | 1087575 A1 * | 3/2001 | ........... H04L/12/46 |
| WO | WO 01/31888 A1 | 5/2001 | |

OTHER PUBLICATIONS

Eriksson, Hans, "MBONE: the multicast backbone", Communications of the ACM, vol. 37, iss. 8, pp. 54–60, Aug. 1994.*

Conta, A. et al., "Genetic packet tunneling in IPv6 specification", RFC 2473, pp. 1–36, Dec. 1998.*

Carpenter, B. et al., "Transmission of IPv6 over IPv4 domains without explicit tunnels", RFC 2529, pp. 1–10, Mar. 1999.*

Lee, D.C. et al. "The next generation of the Internet: aspects of the internet protocol version 6", IEEE Network, vol. 12, issue 1, pp. 28–33, Feb. 1998.*

(List continued on next page.)

*Primary Examiner*—Jason D. Cardone
(74) *Attorney, Agent, or Firm*—McDonnell Boehnen Hulbert & Berghoff

(57) ABSTRACT

The methods and system described herein help the transition from Internet Protocol version-4 ("IPv4") networks to Internet Protocol version-6 ("IPv6") networks. Dual address allocation of IPv4 and/or IPv6 network addresses is provided via a dual protocol stack. Network devices may communicate with legacy IPv4 networks while using IPv6 network addresses on an IPv6 network for local communications. IPv6 over IPv4 remote virtual tunnels are used to allow network devices using IPv6 network addresses on a local IPv6 network to communicate with remote IPv6 networks over IPv4 public networks IPv4 over IPv6 local virtual tunnels may be used to allow network devices to using IPv4 network addresses on a local IPv6 network to communicate with remote IPv4 public networks. The IPv4 addresses allocated include IPv4 addresses that may be allocated and used for Distributed Network Address Translation ("DNAT") and/or the Realm Specific Internet Protocol ("RSIP").

24 Claims, 7 Drawing Sheets

U.S. PATENT DOCUMENTS

| | | | |
|---|---|---|---|
| 5,862,331 A | 1/1999 | Herriot | |
| 5,867,495 A | 2/1999 | Elliott et al. | |
| 5,867,660 A | 2/1999 | Schmidt et al. | |
| 5,872,847 A | 2/1999 | Boyle et al. | |
| 5,889,774 A | 3/1999 | Mirashrafi et al. | |
| 5,892,924 A | 4/1999 | Lyon et al. | |
| 5,915,008 A | 6/1999 | Dulman | |
| 5,933,778 A | 8/1999 | Buhrmann et al. | |
| 5,940,394 A * | 8/1999 | Killian | 370/393 |
| 5,950,195 A | 9/1999 | Stockwell et al. | |
| 6,011,782 A | 1/2000 | DeSimone et al. | |
| 6,038,233 A * | 3/2000 | Hamamoto et al. | 370/401 |
| 6,055,236 A | 4/2000 | Nessett et al. | |
| 6,055,561 A | 4/2000 | Feldman et al. | |
| 6,058,421 A | 5/2000 | Fijolek et al. | |
| 6,079,021 A | 6/2000 | Abadi et al. | |
| 6,101,189 A | 8/2000 | Tsuruoka | |
| 6,101,543 A | 8/2000 | Alden et al. | |
| 6,104,711 A | 8/2000 | Voit | |
| 6,115,751 A | 9/2000 | Tam et al. | |
| 6,118,784 A * | 9/2000 | Tsuchiya et al. | 370/392 |
| 6,134,591 A | 10/2000 | Nickles | |
| 6,137,791 A | 10/2000 | Frid et al. | |
| 6,157,950 A | 12/2000 | Krishnan | |
| 6,172,986 B1 | 1/2001 | Watanuki et al. | |
| 6,185,184 B1 | 2/2001 | Mattaway et al. | |
| 6,195,705 B1 | 2/2001 | Leung | |
| 6,212,183 B1 | 4/2001 | Wilford | |
| 6,212,563 B1 | 4/2001 | Beser | |
| 6,249,820 B1 | 6/2001 | Dobbins et al. | |
| 6,266,707 B1 | 7/2001 | Boden et al. | |
| 6,269,099 B1 | 7/2001 | Borella et al. | |
| 6,308,213 B1 * | 10/2001 | Valencia | 709/201 |
| 6,327,267 B1 * | 12/2001 | Valentine et al. | 370/355 |
| 6,330,562 B1 * | 12/2001 | Boden et al. | 707/10 |
| 6,353,614 B1 | 3/2002 | Borella et al. | |
| 6,353,891 B1 | 3/2002 | Borella et al. | |
| 6,381,638 B1 * | 4/2002 | Mahler et al. | 370/355 |

OTHER PUBLICATIONS

Loukola, M.V. et al., "New possibilies offered by IPv6", IEEE Proceed. Intern. Conf. on Computer Communications and Networks, ISBN: 0–8186–9014–3, pp. 548–552, Oct. 1998.*

Wang, Kai et al., "DTTS: a transparent and scalable solution for IPv4 to IPv6 transition", IEEE Proceed. Inter. Conf. on Computer Communications, ISBN: 0–7803–7128–3, pp. 248–253, Oct. 2001.*

Hagino, J. et al, "An IPv6 to IPv4 Transport Relay Translator", RFC 3142, pp. 1–11, Jun. 2001.*

Huitema, Christian, "Routing In The Internet", 1995 by Prentice Hall PTR, pp. 1–319.

Borella, Michael, Technology Update—Protocol Helps Stretch IPv4 Addresses, "Network World", vol. 17, No. 3, Jan. 17, 2000, p. 43.

Kent, Stephen, Evaluating Certification Authority Security, Aerospace Conference, 1998 IEEE, Online, vol. 4, pp. 319–327 (Mar. 21–23, 1998).

Thayer, Rodney, Bulletproof IP With Authentication and Encryption IPSec Adds a Layer of Armor to IP, Data Communications, vol. 26, No. 16, pp. 55–58, (Nov. 21, 1997).

Borella, M., Grabelsky, D., Lo, J., Tuniguchi, K., Internet Engineering Task Force, Internet Draft, "Realm Specific IP: Protocol Specification <draft–ietf–nat–rsip–protocol. 06.txt>", Mar. 2000, pp. 1–48.

Borella, M., Grabelsky, D., Lo, J., Tuniguchi, K., Internet Engineering Task Force, Internet Draft, "Realm Specific IP: Protocol Specification <draft–ietf–nat–rsip–protocol. 07.txt>", Jul. 2000, pp. 1–49.

Montenegro, G., Internet Engineering Task Force, Internet Draft, "RSIP Support for End–to–End IPsec," <draft–ietf–nat–rsip–ipsec–04.txt>, Jul. 2000, pp. 1–17.

Borella, M., Lo, J., Grabelsky, D., Montenegro, G., Internet Engineering Task Force, Internet Draft, "Realm Specific IP: Framework <draft–ietf–nat–rsip–framework.05.txt>", Jul. 2000, pp. 1–30.

Borella, M., Montenegro, G., RSIP: Address Sharing with End–to–End Security, USENIX Conference, San Francisco, California, Mar. 9, 2000, pp. 1–9.

Handley, M., et al., SIP: Session Initiation Protocol, Network Working Group, Request for Comments 2543, Mar. 1999, pp. 1–153.

ITU–T Recommendation H.225.0, Call Signaling Protocols and Media Stream Packetization for Packet–Based Multimedia Communication Systems, Series H: Audiovisual and Multimedia Systems—Infrastructure of Audiovisual Services—Transmission Multiplexing and Synchronization, (Feb. 1998).

McCanne et al., "The BSD Packet Filter: A New Architecture for User–Level Packet Capture," Proceedings of the 1993 Winter USENIX Technical Conference (Jan. 1993).

Postel, J., *User Datagram Protocol*, Request for Comments 768, Aug. 1980, pp. 1–3.

Postel, J., *Internet Protocol*, Request for Comments 791, Sep. 1981, pp. I–45.

Postel, J., *Internet Control Message Protocol*, Request for Comments 792, Sep. 1981, pp. 1–21.

Postel, J., *Transmission Control Protocol*, Request for Comments 793, Sep. 1981, pp. i–84.

Postel, J., *File Transfer Protocol (FTP)*, Request for Comments 959, Oct. 1985, pp. 1–69.

Jacobson, V., *TCP Extensions for High Performance*, Request for Comments 1323, May 1992, pp. 1–37.

Droms, R., *Dynamic Host Configuration Protocol*, Request for Comments 2131, Mar. 1997, pp. 1–45.

Stevens, W., *Advanced Sockets API for IPv6*, Request for Comments 2292, Feb. 1998, pp. 1–67.

Gilligan, R. et al., *Basic Socket Interface Extensions for IPv6*, Request for Comments 2553, Mar. 1999, pp. 1–41.

Srisuresh, P.,et al., *IP Network Address Translator (NAT) Terminology and Considerations*, Request for Comments 2663, Aug. 1999, pp. 1–30.

Maurice J. Bach, The Design of the Unix Operating System, Prentice Hall Software Series, 1986, pp. 382–390.

"Cisco IOS Release 12.0 Network Protocols Configuration Guide, Part 1", Configuring IP Addressing, Cisco Systems, 1998, pp. PIC–7 to PIC–58.

Durand, Alain, Deploying Ipv6, IEEE Internet Computing, http://computer.org/internet, Jan.–Feb. 2001, pp. 79–81.

3COM SIP Solutions 1.0 benefits brochure. (4 total pages).

Sidhu, Ikhlaq and Benzaitis, Andrew, Eat or be eaten, www.americasnetwork.com/issues/99/issues/991101/ 991191_eat.htm, printed May 10, 2000. (6 total pages).

Myers, Brad A.; Stiel, Herb; and Gargiulo, Robert, Collaboration Using Multiple PDAs Connected to a PC, Proceedings of the ACM 1998 conference on Computer supported cooperative work, Nov. 14–18, 1998, Seattle, WA. (total 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP–Based IP Telephony System, *IEEE Communications Magazine,* vol. 37, No. 7, Jul. 1999, pp. 96–101. (8 total pages).

Handley/Schulzrinne/Schooler/Rosenberg, SIP: Session Initiation Protocol, Internet Engineering Task Force, draft–ietf–sip–rfc2543bis–02.ps. Sep. 4, 2000. (131 pages).

Borella, M., Lo, J., Grabelsky, D., Montenegro, G., IETF Proceedings presentation, Realm Specific IP: Protocol Specification <draft–nat–rsip–protocol–00.txt>, Apr. 9, 1999 (13 pages).

Marsan, Carolyn Duffy, The Next Best Things to Ipv6? Network World Fusion at http://www.nbwfusion.com/news/1999/0920ipv6.html, Mar. 29, 2000, pp. 1–3.

Borella, M., Lo, J., Grabelsky, D., Montenegro, G., Internet Engineering Task Force, Internet Draft, "Realm Specific IP: Framework <draft –ietf–nat–rsip–framework–.04.txt>", Mar. 2000, pp. 1–30.

IETF Mar. 1999 Proceedings, 2.7.10 Network Address Translators (nat), pp. 1–13.

Rosenberg, Jonathan D. and Shockley, Richard, The Session Initiation Protocol (SIP): A Key Component for Internet Telephony, Computer Telephony.com, Jun. 2000, pp. 124–139.

Fenner, W., *Internet Group Management Protocol Version 2,* RFC 2236, Nov. 1997, pp. 1–24.

Mogul, J. et al., *Internet Standard Subnetting Procedure,* RFC 950, Aug. 1985, pp. 1–18.

Schulzrinne et al., *"RTP: A Transport Protocol for Real–Time Applications",* RFC 1889, pp. 1–75.

Privat, Jermone, "Double Phase DHCP Configuration", <draft–privat–dhc–doublephase–01.txt>, Internet Engineering Task Force, Sep. 1999, pp. 1–4.

Maughan, D. et al., "Internet Security Association with Key Management Protocol", RFC 2408, Nov. 1998, pp. 1–86.

Karn, P., *"Photuris Session–Key Management Protocol",* RFC 2522, Mar. 1999, pp. 1–58.

"Random Number Generators", Computational Science Education Project, 1991, 1992, 1993, 1994 and 1995.

Foster, Ian, *"10 Random Numbers",* 1995.

Afifi, H. et al., Methods for IPv4–IPv6 Transition, Proceedings IEEE International Symposium on Computers and Communications, pp. 478–484, Jul. 6–8, 1999.

Gilligan, R. et al., *Transition Mechanisms for IPv6 Hosts and Routers,* Request for Comments: 1933, pp. 0–22 (Apr. 1996).

Borella, M. et al., Distributed Network Address Translation, Internet Draft, pp. 0–24 (Oct. 1998).

Borella, M. et al., Realm Specific IP: Protocol Specification, Internet Draft, pp. 1–27 (Aug. 1999).

International Search Report for PCT Applications Serial No. PCT/US00/41211, Dated Feb. 23, 2001.

G. Montene, Internet Engineering Task Force, Internet Draft, "Negotiated Address Reuse" (NAR), <draft–montenegro–aatn–nar–00.txt>, May 1998, pp. 1–22.

George Tsirtsis, Alan O'Neill, Internet Engineering Task Force, Internet Draft, "NAT Bypass for End 2 End 'Sensitive' Applications," <draft–tsirtsis–nat–bypass–00.txt>, Jan. 1998, pp. 1–5.

George Tsirtsis, Pyda Srishuresh, Internet Engineering Task Force, Internet Draft, "Network Address Translation—Protocol Translation (NAT–PT), <draft–ietf–ngtrans–natpt–04.txt>," Jan. 1999, pp. 1–13.

Jeffrey Lo, K. Taniguchi, Internet Engineering Task Force, Internet Draft, "IP Host Network Address (and port) Translation," <draft–ietf–nat–hnat–00.txt>, Nov. 1998, pp. 1–13.

Michael Borella, David Grabelsky, Ikhlaq Sidhu, Brian Petry, Internet Engineering Task Force, Internet Draft, "Distributed Network Address Translation," <draft–borella–aatn–dnat–01.txt>, Oct. 1998, pp. 1–21.

P. Srisuresh, G. Tsirtsis, P. Akkiraju, A. Hefferman, Internet Engineering Task Force, Internet Draft, "DNS Extensions to Network Address Translators", (DNS_ALG), <draft–etf–nat–dns–alg–01.txt>, Oct. 1998, pp. 1–24.

P. Srisuresh, Internet Engineering Task Force, Internet Draft, "Security for IP Network Address Translator (NAT) Domains," <draft–ietf–nat–security.00.txt.>, Nov. 1998, pp. 1–11.

P. Srisuresh, K. Eg, Internet Engineering Task Force, Internet Draft, "The IP Network Address Translator" (NAT), <draft–rfced–info–srisuresh–05.txt>, Feb. 1998, pp. 1–24.

P. Srisuresh, K. Egev, Internet Engineering Task Force, Internet Draft, "Traditional IP Network Address Translator (Traditional NAT)," <draft–ietf–nat–traditional–01.txt>, Oct. 1998, pp. 1–17.

P. Srisuresh, Matt Holdrege, Internet Engineering Task Force, Internet Draft, "IP Network Address Translator (NAT) Terminology and Considerations," =draft–ietf–nat–terminology–01.txt>, Oct. 1998, pp. 1–28.

Praveen Akkiraju, Yakov Rekhter, Internet Engineering Task Force, Internet Draft, "A Multihoming Solution Using NATs" <draft–akkiraju–nat–multihoming–00.txt>, Nov. 1998, pp. 1–32.

R. G. Moskowitz, Internet Engineering Task Force, Internet Draft, "Network Address Translation Issues with IPsec," <draft–moskowitz–net66–vpn–00.txt>, Feb. 6, 1998, p. 1–8.

R. Thay, N. Doraswa and R. Gle, Internet Engineering Task Force, Internet Draft "IP Security," <draft–ietf–ipsec–doc–roadmap–02.txt.>, Nov. 1997, pp. 1–12.

T. Hain, Internet Engineering Task Force, Internet Draft, "Architectural Implications of NAT," <draft–iab–nat–implications–02.txt>, Oct. 1998, pp. 1–14.

W.T. Teo, S.W. Yeow, R. Singh, Internet Engineering Task Force, Internet Draft, "IP Relocation Through Twice Network Address Translators," <draft–ietf–nat–mat–00.txt>, Feb. 1999, pp. 1–20.

W.T. Teo, S.W. Yeow, R. Singh, Internet Engineering Task Force, Internet Draft, "Reverse Twice Network Address Translators" (RAT), <draft–teoyeow–mip–rat–01.txt>, Dec. 1998, pp. 1–20.

W.T. Teo, Y. Li, Internet Engineering Task Force, Internet Draft, "Mobile IP Extension for Private Internets Support," <draft–teoyli–mobileip–mvpn–02.txt>, Feb. 1999, pp. 1–24.

Yakov, Rekhter, Internet Engineering Task Force, Internet Draft, "Implications of NATs on the TCP/IP Architecture," <draft–ietf–nat–arch–implications–00.txt>, Feb. 1999, pp. 1–7.

K. Egevang, and P. Francis, Internet Engineering Task Force, ("IETF"), Request for Comments ("RFC") RFT–1631, "The IP Network Address Translator (NAT)", May 1994, pp. 1–10.

* cited by examiner

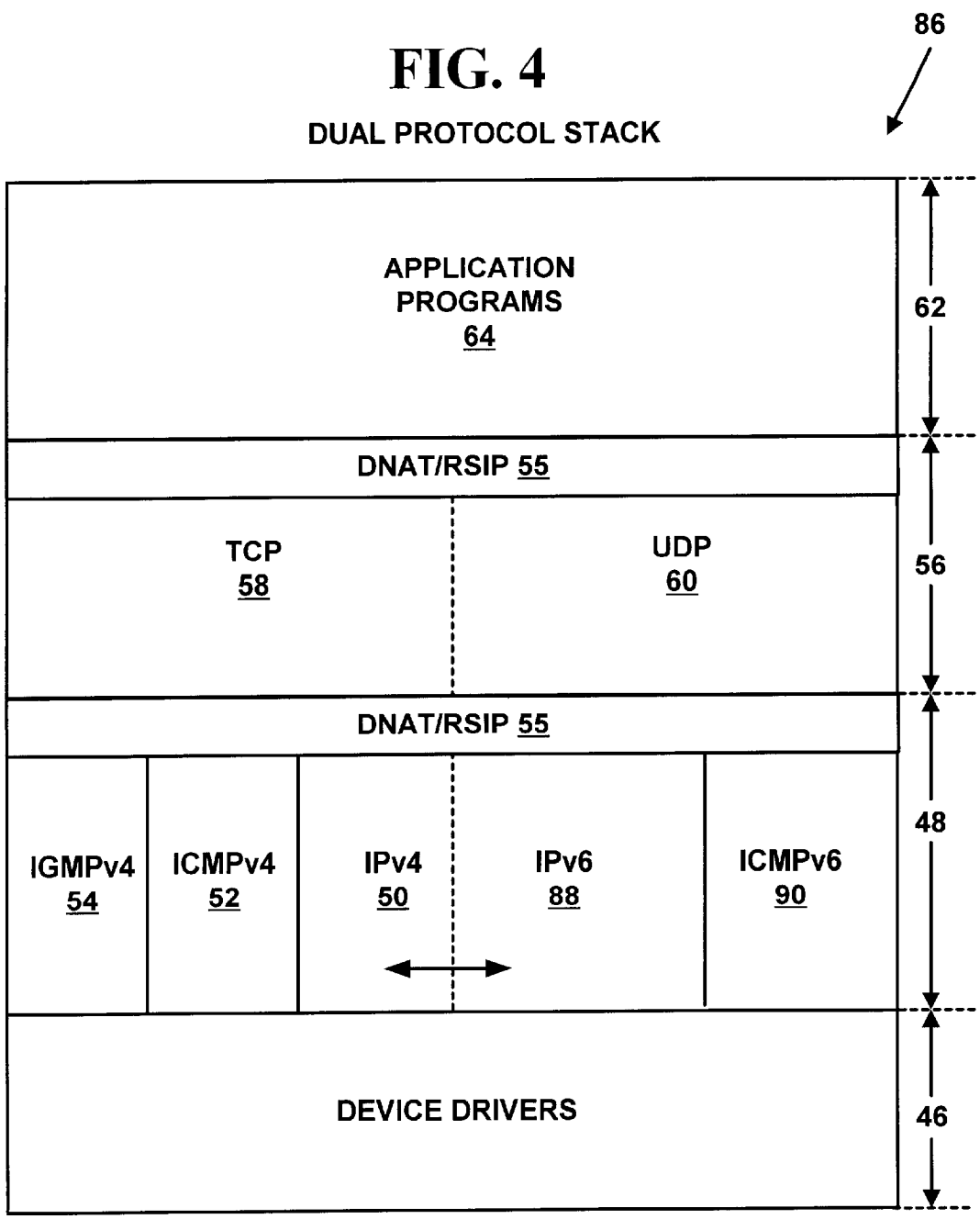

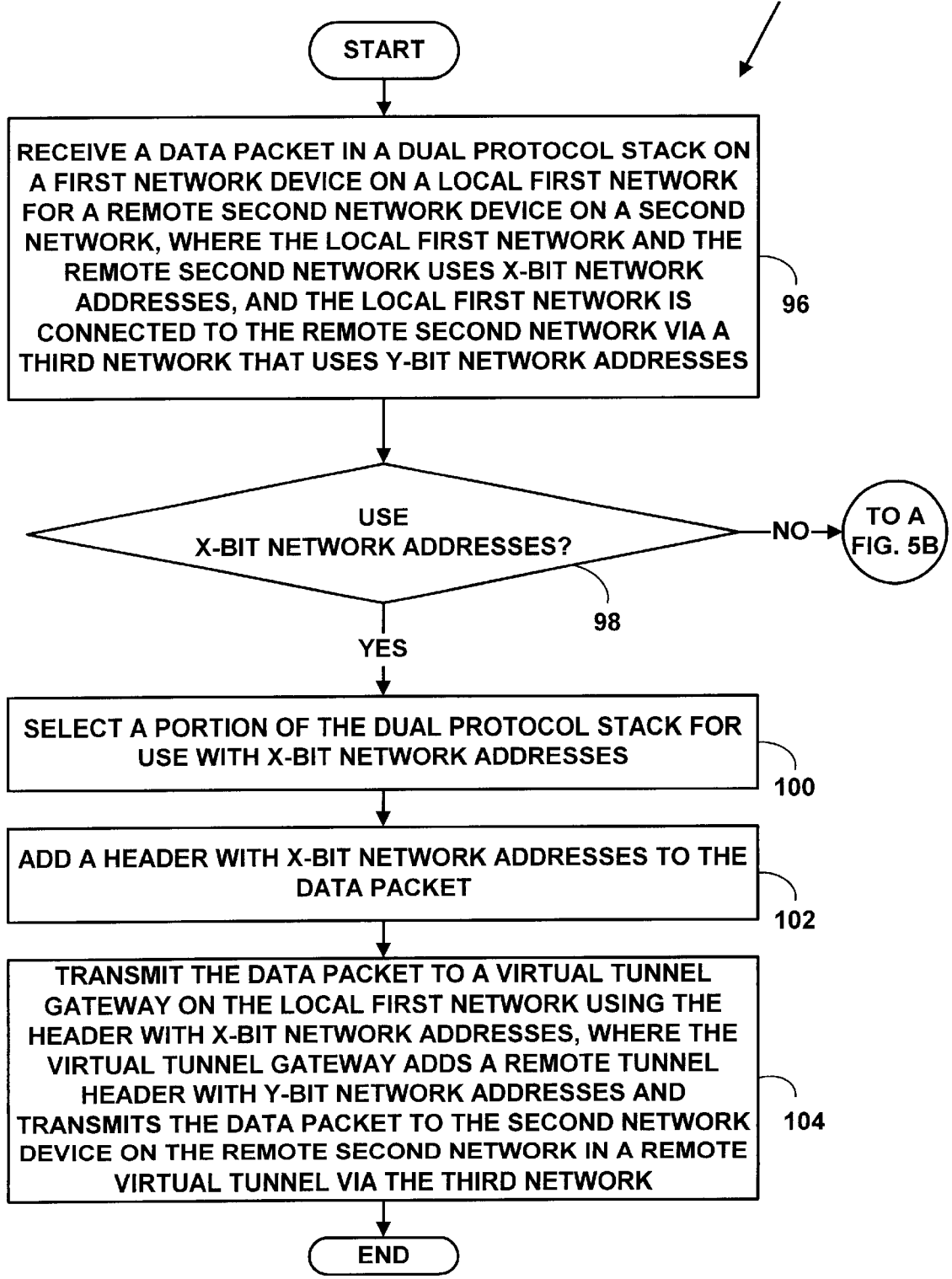

METHOD AND SYSTEM FOR DUAL-NETWORK ADDRESS UTILIZATION

FIELD OF INVENTION

This invention relates to computer networks. More specifically, it relates to a method and system for dual network address utilization.

BACKGROUND OF THE INVENTION

The Internet Protocol ("IP") is an addressing protocol designed to facilitate the routing of traffic within a network or between networks. The Internet Protocol is used on many computer networks including the Internet, intranets and other networks. Current versions of Internet Protocol such as Internet Protocol version-4 ("IPv4") are becoming obsolete because of limited address space. With a 32-bit address-field, it is possible to assign $2^{32}$ different addresses, which is 4,294,967,296, or greater than 4 billion globally unique addresses.

However, with the explosive growth of the Internet and intranets, Internet Protocol addresses using a 32-bit address-field may soon be exhausted. Internet Protocol version-6 ("IPv6") proposes the use of a 128-bit address-field for Internet Protocol addresses. However, a large number of legacy networks including a large number of Internet subnets will still be using older versions for Internet Protocol with a 32-bit address space for many years to come. As is known in the art, a subnet is smaller of part of a larger network using a similar network addressing scheme.

Network Address Translation ("NAT") has been proposed to extend the lifetime of Internet Protocol version 4 by allowing subnets with private Internet Protocol addresses to exist behind a single or small number of globally unique Internet Protocol addresses (see e.g., Internet Engineering Task Force ("ITEF") RFC 2663, "IP Network Address Translator ("NAT") Terminology and Considerations," by P. Srisuresh and M. Holdrege, August 1999). Each private host uses a single global Internet Protocol address for communication with external networks such as the Internet.

Internally, a subnet may use local private addressing. Local private addressing may be any addressing scheme that is different from the public Internet Protocol addressing. The local addresses on a subnet are typically not available to the external, global Internet. When a device or node using local addressing desires to communicate with the external world, its local address is translated to a common external Internet Protocol address used for communication with an external network by a network address translation device. That is, network address translation allows one or more global Internet Protocol addresses to be shared among a larger number of two network devices using local private addresses.

There are several problems associated with using network address translation to extend the life of the Internet Protocol version-4. Network address translation interferes with the end-to-end routing principal of the Internet that recommends that packets flow end-to-end between network devices without changing the contents of any packet along a transmission route (see e.g., "Routing in the Internet," by C. Huitema, Prentice Hall, 1995, ISBN 0-131-321-927).

Current versions of network address translation replace a local network address in a data packet header with an external global network address on outbound traffic, and replace an external global network address in a data packet header with a local private network address on inbound traffic. This type of address translation is computationally expensive, causes security problems by preventing certain types of encryption from being used, or breaks a number of existing applications in a network that cannot coexist with network address translation (e.g., File Transfer Protocol ("FTP")).

Current versions of network address translation may not gracefully scale beyond a small subnet containing a few dozen nodes or devices because of the computational and other resources required. Network address translation potentially requires support for many different application layer internal network protocols be specifically programmed into a translation mechanism such as a network address translation router.

Computational burdens placed on a network address translation router may be significant and degrade network performance, especially if several network address translation-enabled sub-networks share the same network address translation router. In a worst case scenario, a network address translation router translates every inbound and data packet.

Application Layer Gateways ("ALG") have also been used at a border between a private network and a public network like the Internet to provide address translation. As is known in the art, a gateway is a device that connects two networks using different communications protocols so that information can be passed from one to the other. A gateway both transfers information and converts it to a form compatible with the protocols used by a receiving network.

However, the Application Layer Gateways complicate the deployment of new applications. Sending and receiving systems need to support the new applications, and any Application Layer Gateways in a routing path must be able to identify new applications to provide network address translation.

Some of the problems associated with network address translation of private network addresses into public network addresses have been overcome with Distributed Network Address Translation ("DNAT") described in co-pending application Ser. No. 09/035,600 (now U.S. Pat. No. 6,353, 614), Ser. Nos. 09/270,967 and 09/271,025 (now U.S. Pat. No. 6,055,236), assigned to the same Assignee as the present application. See also "Distributed Network Address Translation", by Michael Borella, David Grabelsky, Ikhlaq Sidhu, and Brian Petry, IETF Internet Draft, <draft-borella-aatn-dnat-01.txt>, October 1998. Distributed Network Address Translation is also called "Realm Specific Internet Protocol" ("RSIP") by the IETF. For more information on Realm Specific Internet Protocol see "Realm Specific IP Framework," by M. Borella and J. Lo, IETF draft, <draft-ieft-nat-rsip-framework-02.txt>, October 1999, and "Realm Specific IP: Protocol Specification," by M. Borella and J. Lo, IETF draft, <draft-ietf-nat-rsip-protocol-02.txt>, August 1999.

For Distributed Network Address Translation or Realm Specific Internet Protocol, network devices request a set of locally unique ports from a Distributed Network Address Translation server or a Realm Specific Internet Protocol server for external communications with a public network like the Internet. A network device on a private network replaces default or ephemeral ports (e.g., such as Transmission Control Protocol or User Datagram Protocol) with the locally unique ports. The network device uses a combination network address including a locally unique port and a common external network address (e.g., an IP address) for the Distributed Network Address Translation server for communications with the external networks. The network devices use private network addresses for local communications on the private network.

A Distributed Network Address Translation server or a Realm Specific Internet Protocol server maintains a port-to-private network address table as locally unique ports are allocated to network devices. Network devices send data packets to external networks using a combination network address including a locally unique port and the common external network address via the Distributed Network Address Translation server or Realm Specific Internet Protocol server. For inbound data packets from an external network, the Distributed Network Address Translation server or Realm Specific Internet Protocol uses the port-to-private network address table to route data packets back to the appropriate network device on the private network.

Distributed Network Address Translation or Realm Specific Internet Protocol allows a host to tunnel data packets to/from a network device and a server over a virtual tunnel. As is known in the art, a "virtual tunnel" is created by encapsulating a data packet inside another data packet. The outer header typically identifies the "endpoints" of the tunnel. The inner header typically identifies an original sender and recipient of the data. Thus, data packets are not modified between a source and a destination using Distributed Network Address Translation or Realm Specific Internet Protocol.

It is becoming commonplace for private stub network or subnets to be "multiple address networks." Multiple address networks are networks in which more than one type of network address is used. For example, a private subnet may use new 128-bit Internet Protocol version-6 addresses to communicate internally and may use the older 32-bit Internet Protocol version-4 addresses to communicate with external networks such as the Internet.

However, there are a number of problems associated with using Internet Protocol version-6 addresses on a private subnet and Internet Protocol version-4 addresses on public networks like the Internet. One problem is that Internet Protocol version-6 subnets and Internet Protocol version-4 subnets can not communicate directly with one another without translation of network addresses since Internet Protocol version-4 uses 32-bit addresses and Internet Protocol version-6 uses 128-bit addresses. The network address translations required are subject to the network address translation problems described above.

Another problem is that some network devices will support only Internet Protocol version-6, others will support only Internet Protocol version-4, and still others will support both versions of the Internet Protocol. Network address translators have to be provided with information as to which network devices support which version of the Internet Protocol to provide network address translation. This complicates the deployment of new applications that are used across networks.

Thus, it is desirable to provide a solution that allows legacy Internet Protocol version-4 subnets to be connected to and communicate with newer Internet Protocol version-6 subnets. The solution should allow network devices to use any combination of Internet Protocol version-6 and/or Internet Protocol version-4 on a subnet with limited computational burdens and without complicating deployment of new applications.

SUMMARY OF THE INVENTION

In accordance with preferred embodiments of the present invention, some of the problems associated supporting legacy networks are overcome. A method and system for dual network address utilization is provided.

One aspect of the invention includes a method for dual network address utilization. A dual protocol stack provides dual address allocation of X-bit and Y-bit network addresses (e.g., 128-bit Internet Protocol version-6 and 32-bit Internet Protocol version-4 network addresses). Network devices communicate with legacy Y-bit networks while using X-bit network addresses on an X-bit network for local communications. X-bit over Y-bit remote virtual tunnels are used to allow network devices using X-bit network addresses on a local X-bit network to communicate with remote X-bit networks over Y-bit networks (e.g., the Internet). Y-bit over X-bit local virtual tunnels may be used to allow network devices to using Y-bit network addresses on a local X-bit network to communicate with remote Y-bit networks. The Y-bit addresses allocated include Y-bit addresses may also used for the Distributed Network Address Translation protocol and/or the Realm Specific Internet Protocol.

Another aspect of the invention includes a system for dual network address utilization. The dual network address system includes a multiple network devices including a dual protocol stack and a virtual tunnel gateway. The dual protocol stack includes a first portion for networking protocols using X-bit network addresses and a second portion for networking protocols using Y-bit network addresses. The virtual tunnel gateway is used for adding a remote tunnel header for a remote virtual tunnel for a data packet with a header including X-bit network addresses sent from a local network by a local network device using X-bit network addresses across an intermediate network using Y-bit network addresses to a remote network device on a remote network using X-bit network addresses. The virtual tunnel gateway is also used for removing a local tunnel header including X-bit network addresses for a data packet with a header including Y-bit network addresses and for transmitting the data packet with the header including Y-bit network address across the intermediate network using Y-bit network addresses.

The methods and system described herein may help the transition from Internet Protocol version-4 ("IPv4") networks to Internet Protocol version-6 ("IPv6") networks. However, the present invention is not limited to such an embodiment, and can be used with virtually any set of networks that require transitions between X-bit and Y-bit network addresses and dual network address utilization.

The foregoing and other features and advantages of a preferred embodiment of the present invention will be more readily apparent from the following detailed description. The detailed description proceeds with references to the accompanying drawings.

BRIEF DESCRIPTION OF THE DRAWINGS

Preferred embodiments of the present inventions are described with reference to the following drawings, wherein:

FIG. 4 is a block diagram illustrating an exemplary dual protocol stack;

FIGS. 5A and 5B are a flow diagram illustrating a method for dual network address utilization;

DETAILED DESCRIPTION OF PREFERRED EMBODIMENTS

Exemplary Network System

Figure 1:
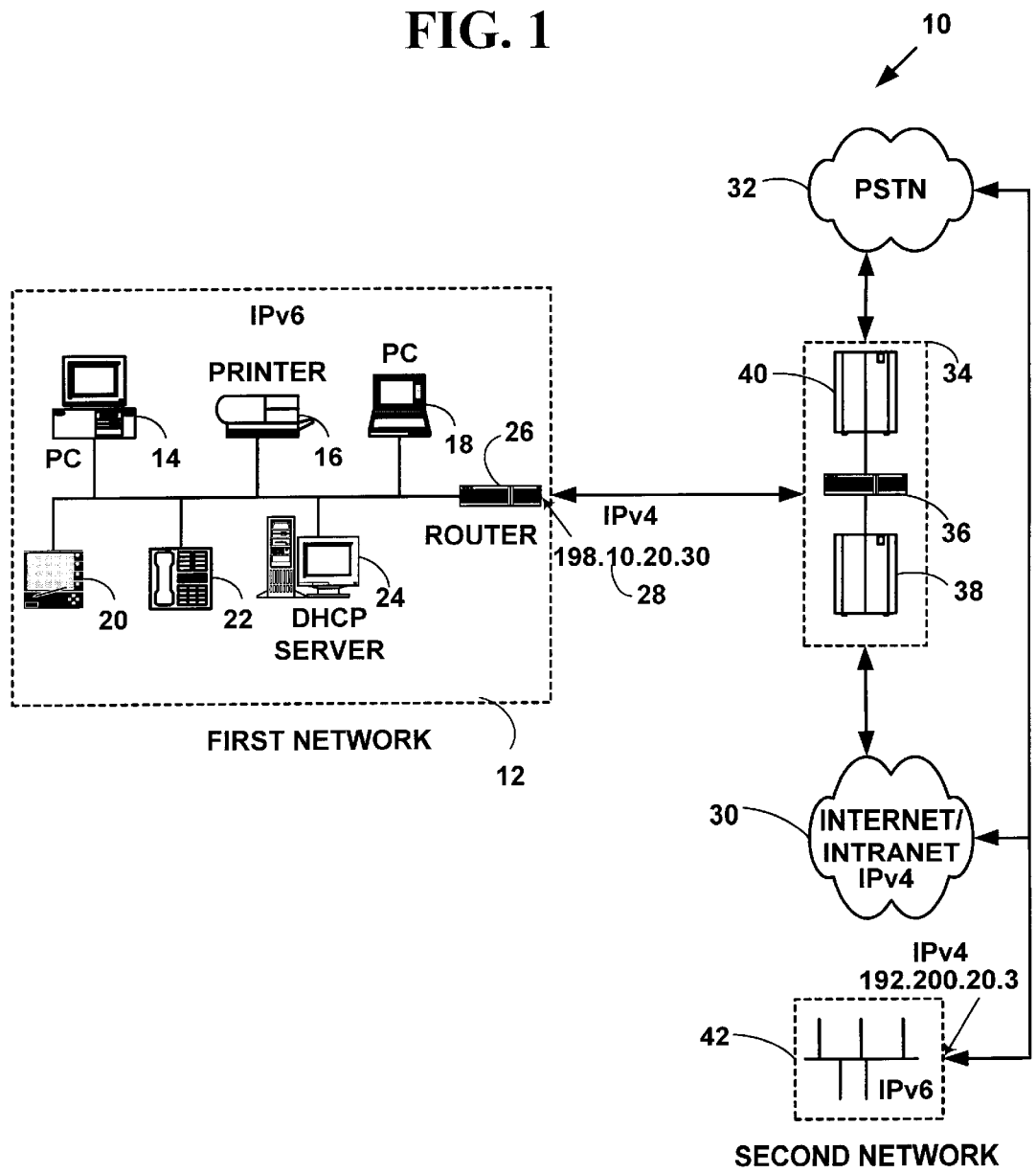
FIG. 1 is a block diagram illustrating an exemplary network system.

FIG. 1 is a block diagram illustrating an exemplary network system 10 for one preferred embodiment of the present invention. The network system 10 includes a first computer network 12 with multiple network devices (14, 16, 18, 20, 22) and a router 26 to route data packets to another external computer network. The multiple network devices include any of computers (14, 18), printers 16, personal digital assistants 20, telephones 22, or other hand-held devices or other network devices that can be connected to the first computer network 12. The first computer network 12 may also include a Dynamic Host Configuration Protocol ("DHCP") server 24. As is known in the art, the Dynamic Host Configuration Protocol is a protocol for dynamically passing network addresses such as Internet Protocol addresses and configuration information to network devices on a network. For more information on DHCP see IETF RFC-1541, and RFC-2131 and RFC-2132, incorporated herein by reference.

The first computer network 12 has an external common network address 28 (e.g., a global Internet Protocol version-4 address, 198.10.20.30) to identify the first computer network 12 to an external computer network such as a second computer network 30 and/or a third computer network 32 external to the first private computer network-x 12. The multiple network devices (14, 16, 18, 20, 22, 24 and 26) have a local network address (e.g., an Internet Protocol version-6) on the first computer network 12. In one preferred embodiment of the present invention, a network access service provider 34 with a router 36 routes data packets to/from the first computer network 12 a to second computer network 30 and/or to a third computer network 32 through a second network switch 38 and/or a third network switch 40. In another embodiment of the present invention, the first computer network 12 is connected directly to the second computer network 30. The first computer network 12 is also connected to a second computer network 42 via computer networks 30 or 32. The second computer network 42 is also a computer network that includes multiple network devices (not illustrated in FIG. 1) that use local internal network addresses (e.g., Internet Protocol version-6 addresses) behind a public globally routable network address of (e.g., a global Internet Protocol version-4 address 192.200.20.3).

In one preferred embodiment of the present invention, the first computer network 12 is a Small Office/Home Office ("SOHO") Local Area Network ("LAN"), also called a "legacy" LAN. The first computer network 12 can also be a "stub" network or a sub-network ("subnet"). As is known in the art, a "stub" network is an end or terminal network. As is known in the art, a "subnet" is a smaller part of a larger network that uses a common addressing scheme (e.g., Internet Protocol addresses). The second network 30 is the Internet or an intranet, using Internet Protocol version-4 network addresses and the third network 32 is a Public Switched Telephone Network ("PSTN"). The second network-y 42 is also a SOHO LAN, stub network or subnet. However, other network types and network components can also be used and the present invention is not limited to the network types and network components described for this preferred embodiment.

Network devices and routers for preferred embodiments of the present invention include network devices that can interact with network system 10 and network system 68 (FIG. 3) discussed below that are compliant with all or part of standards proposed by the Institute of Electrical and Electronic Engineers ("IEEE"), International Telecommunications Union-Telecommunication Standardization Sector ("ITU"), Internet Engineering Task Force ("IETF"), the Wireless Application Protocol ("WAP") Forum, and Data-Over-Cable-Service-Interface-Specification ("DOCSIS") standards for Multimedia Cable Network Systems ("MCNS"). However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." IETF standards can be found at the URL "www.ietf.org." The WAP standards can be found at the URL "www.wap-forum.org." The DOCSIS standards can be found at the URL "www.cablemodem.com."

An operating environment for network devices and routers of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Exemplary Protocol Stack

Figure 2:
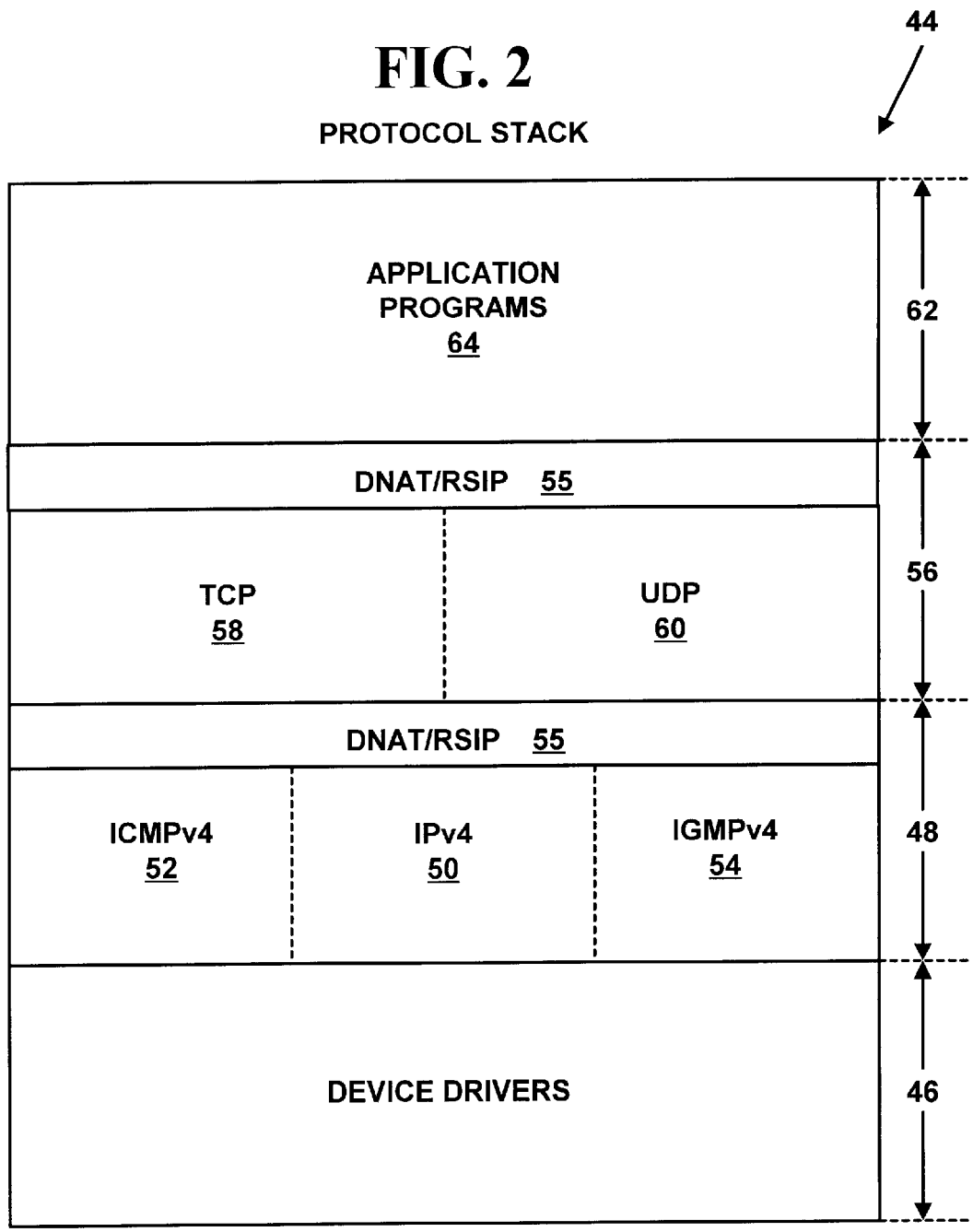
FIG. 2 is a block diagram illustrating a protocol stack for a network device.

FIG. 2 is a block diagram illustrating an exemplary layered protocol stack 44 for network devices on Internet Protocol version-4 subnets on the exemplary dual stack network system 68 (FIG. 3) discussed below. The layered protocol stack 44 is described with respect to Internet Protocol suites comprising from lowest-to-highest, a link, network, transport and application layer. However, more or fewer layers could also be used, and different layer designations could also be used for the layers in the protocol stack 44 (e.g., layering based on the Open Systems Interconnection ("OSI") model).

The network devices are connected to a computer network with Network Interface Card ("NIC") device drivers in a link layer 46 for the hardware network devices connecting the network devices to the computer network 12. The link layer 44 may include a Medium Access Control ("MAC") protocol layer or other data-link layer protocol.

Above the link layer 48 is a network layer 48 (also called the Internet Layer for Internet Protocol suites). The network layer 48 includes an Internet Protocol version-4 ("IPv4") layer 50. As is known in the art, IPv4 50, is an addressing protocol designed to route traffic within a network or between networks. IPv4 layer 50, hereinafter IPv4 50, is described in IETF RFC-791, incorporated herein by reference. The network layer 48 also includes an Internet Group Management Protocol version-4 ("IGMPv4") layer 52, and an optional Internet Control Message Protocol version-4 ("ICMPv4") layer 54. The IGMP v4 layer 52 and the ICMP v4 layer 54 are used with IPv4 50.

ICMPv4 layer 52, hereinafter ICMPv4 52, is used for Internet Protocol control. The main functions of ICMPv4 52 include error reporting, reachability testing (e.g., "pinging"), route-change notification, performance, subnet addressing and other maintenance. For more information on ICMPv4 52 see IETF RFC-792, incorporated herein by reference. IGMPv4 layer 54, hereinafter IGMPv4 54, is responsible for multicasting. For more information on IGMPv4 54 see IETF RFC-1112, incorporated herein by reference. IGMPv4 54 are not both required in the protocol stack 44. ICMP v4 52 is often used without IGMPv4 54.

The network layer 48 may also include an optional Distributed Network Address Translation ("DNAT") or Realm Specific Internet Protocol ("RSIP") layer 55. The DNAT/RSIP layer 55 is used to allocate locally unique ports as well as a combination network address including a locally unique port and a common external network address (e.g., an IP v4 address) for a DNAT/RSIP server for communications with the external networks. For more information on DNAT, see co-pending U.S. application Ser. No. 09/035,600 incorporated herein by reference. DNAT is also referred to as "Realm Specific Internet Protocol" ("RSIP") by the IETF. For more information on RSIP see, "Realm Specific IP Framework," by M. Borella and J. Lo, IETF draft, <draft-ieft-nat-rsip-framework-02.txt>, October 1999, "Realm Specific IP: Protocol Specification," by M. Borella and J. Lo, IETF draft, <draft-ietf-nat-rsip-protocol-02.txt>, August 1999, incorporated herein by reference.

Above network layer 48 is a transport layer 56. The transport layer 56 includes a Transmission Control Protocol ("TCP") layer 58 a User Datagram Protocol ("UDP") layer 60, and an optional DNAT/RSIP layer 55 described above. The TCP layer 58, hereinafter TCP 58, provides a connection-oriented, end-to-end reliable protocol designed to fit into a layered hierarchy of protocols which support multi-network applications. TCP 58 provides for reliable inter-process communication between pairs of processes in network devices attached to distinct but interconnected networks. For more information on TCP 58 see IETF RFC-793, incorporated herein by reference.

The UDP layer 60, hereinafter UDP 60, provides a connectionless mode of communications with datagrams in an interconnected set of computer networks. UDP 60 provides a transaction oriented datagram protocol, where delivery and duplicate packet protection are not guaranteed. For more information on UDP 60 see IETF RFC-768, incorporated herein by reference. Both TCP 58 and UDP 60 are not required in protocol stack 42. Either TCP 58 or UDP 60 can be used without the other.

Above the transport layer 56 is an application layer 62 including application programs 64. The application programs 64 provide desired functionality to a network device (e.g., telephony or other communications functionality).

Exemplary Dual Network Address Utilization System

Figure 3:
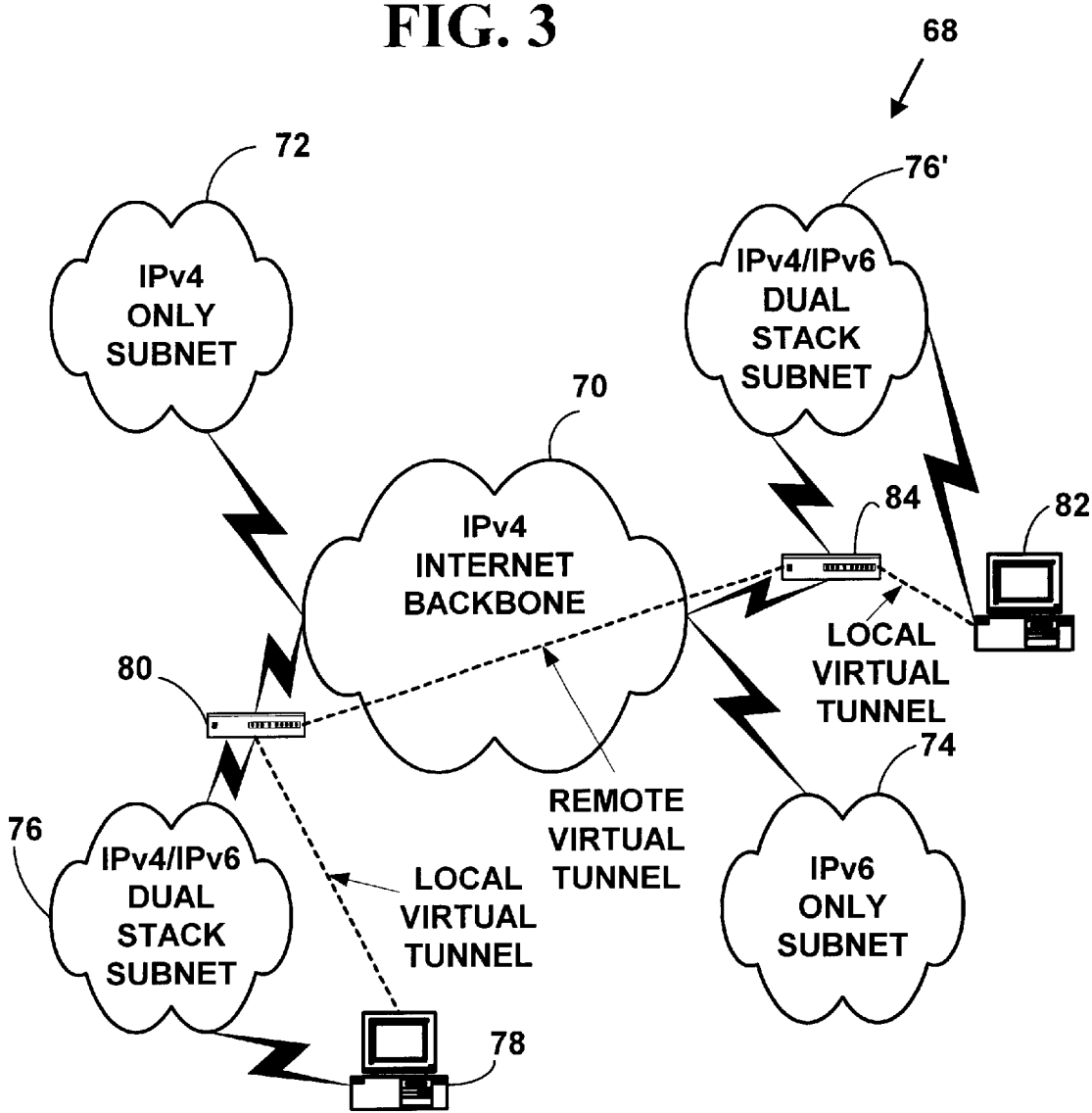
FIG. 3 is a block diagram illustrating an exemplary dual network address utilization system.

FIG. 3 is a block diagram illustrating an exemplary dual network address utilization system 68. The exemplary network utilization system 68 includes an IPv4 Internet backbone 70, one or more IPv4 only subnets 72, one or more IPv6 only subnets 74, and one or more IPv4/IPv6 dual protocol stack subnets 76 and 76' (e.g., first network-x 12 or second network-y 42). FIG. 3 illustrates only one IPv4 only subnet 72, only one IPv6 only subnet 74 and two IPv4/IPv6 dual protocol stack subnets 74 and 76 for the sake of simplicity. However, the exemplary dual network address utilization system 68 typically may include tens or hundreds of such subnets. Exemplary IPv4/IPv6 dual protocol stack subnet 76 includes an exemplary first network device 78 (e.g., a computer) and an exemplary first virtual tunnel gateway 80. Exemplary IPv4/IPv6 dual protocol stack subnet 76' includes an exemplary second network device 82 and an exemplary second virtual tunnel gateway 84. Use of network devices 78, 82 including a dual protocol stack 86 as is explained below.

The virtual tunnel gateways 80, 84 are used to create a virtual tunnel. The virtual tunnel gateways 80, 84 may also include a DNAT/RSIP server. As is known in the art, a gateway is a device that connects networks using different communications protocols so that information can be passed from one to the other. A gateway both transfers information and converts it to a form compatible with the protocols used by the receiving network.

As is known in the art, a "virtual tunnel" can be created by encapsulating a data packet inside another data packet. For example, an outer header is added before an inner header of a data packet. Between the inner header and outer headers are any other headers for a data path, or security, such as security headers specific to a tunnel configuration. The outer header typically identifies the "endpoints" of the tunnel. The inner header typically identifies an original sender and recipient of the data. For more information, see "IP-in-IP tunneling," by W. Simpson, IETF RFC-1853, October 1995, incorporated herein by reference. However, the present invention is not limited this exemplary architecture and more or fewer, and other types of network devices and subnet may also be used.

In the exemplary network utilization system 68, the IPv4 Internet backbone 70 connects a number of legacy IPv4 only subnets 72, new IPv6 only subnets 74 and new dual protocol stack IPv4/IPv6 subnets 76. Communication over the IPv4 Internet backbone between any two subnet uses IPv4 or uses an IPv4 virtual tunnel. Note that the IPv4 only subnet 72 and the IPv6 only subnet 74 cannot currently communicate directly with each other without some form of direct IPv4-to-IPv6 and IPv6-to-IPv4 network address translation.

Exemplary Dual Protocol Stack

FIG. 4 is a block diagram illustrating an exemplary dual protocol stack 86. The dual protocol stack 86 is used on network devices and virtual tunnel gateways on dual protocol stack IPv4/IPv6 subnets 76. The dual protocol stack 86 includes a link layer 46, a network layer 48, a transport layer 56 and an application layer 62 with the protocols described above for the protocol stack 44 illustrated in FIG. 2.

In addition, the dual protocol stack 86 includes a first IP layer including 32-bit versions of IPv4 50, ICMPv4 52. The dual protocol stack 74 also includes a second IP layer including 128-bit versions of IPv6 88, and ICMPv6 90. IPv6 88 now includes IGMP functionality so, no separate IGMPv6 layer is illustrated. The dual protocol stack 86 can send and receive IP data packets with either 32-bit IPv4 addresses and/or 128-bit IPv6 addresses.

For more information on IPv6 88 see IETF-RFC 2460, "Internet Protocol, Version 6 ("IPv6") Specification," by S. Deering and R. Hinden, December 1998, incorporated herein by reference. For more information on ICMPv6 90 see IETF-RFC 2463, "Internet Control Message Protocol ("ICMPv6") for the Internet Protocol Version 6 ("IPv6") Specification", by A. Conta and S. Deering, December 1998, incorporated herein by reference.

Network devices and virtual tunnel gateways include dual protocol stack 86 on dual protocol stack IPv4/IPv6 subnets 76. Network devices on IPv4 only subnets 72 include protocol stack 44. Network devices on IPv6 subnets 74 only include a protocol stack with versions of IPv6 protocols (not illustrated in the FIGs.).

Dual Network Address Utilization

Figure 5B:
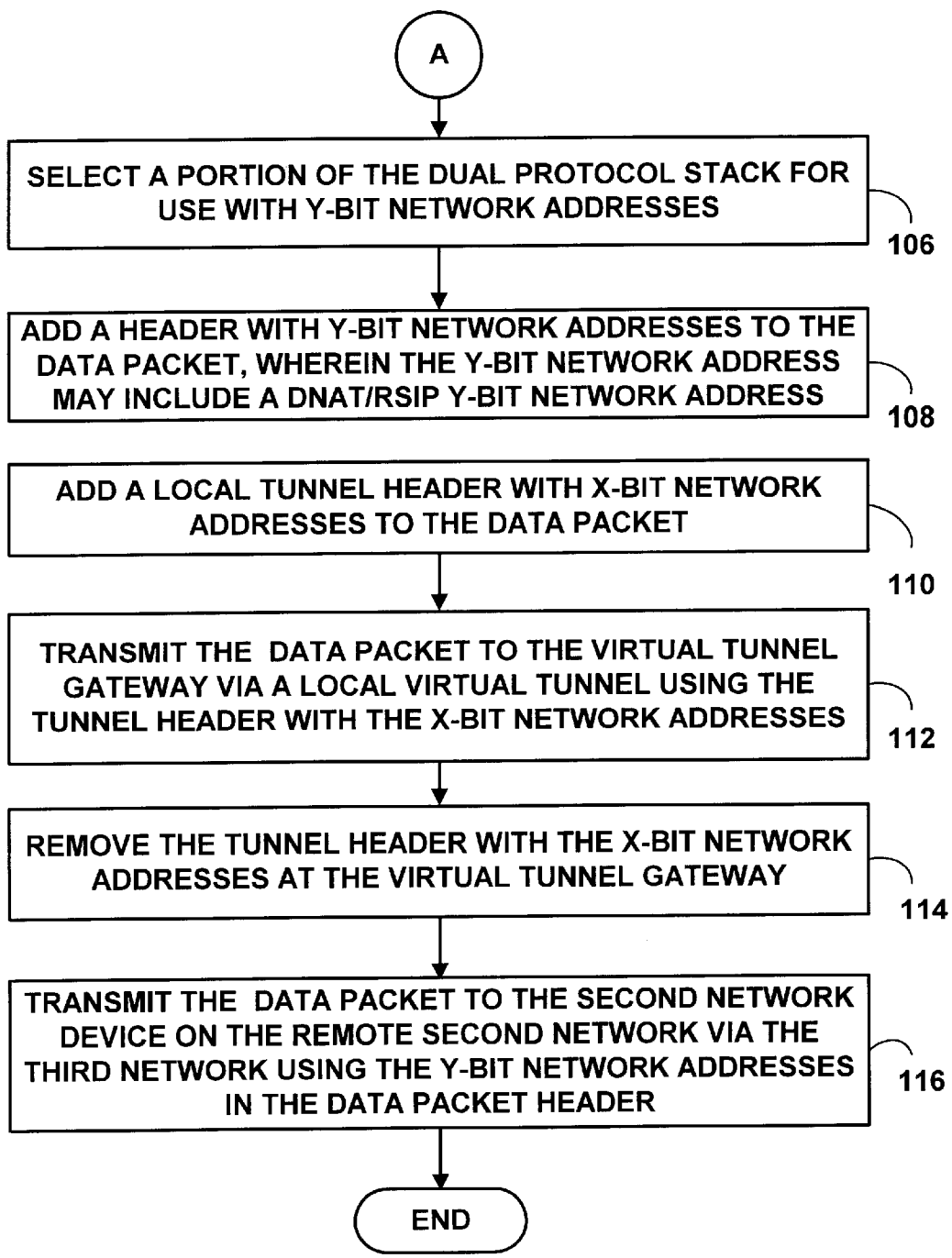

FIGS. 5A and 5B are a flow diagram illustrating a Method 94 for dual network address utilization. In FIG. 5A at Step 96, a data packet is received in a protocol stack on a dual protocol stack on a first network device on a local first network for a second network device on a remote second network. The local first network uses X-bit network addresses and the remote second network uses X-bit network addresses. The local first network is connected to the remote second network by a third network that uses Y-bit network addresses. At Step 98, a test is conducted from the protocol stack on the dual protocol stack on the first network device to determine whether the data packet will use an X-bit network address.

If the data packet will use an X-bit network address, at Step 100 a first portion of the dual protocol stack is selected with a networking protocol using X-bit network addresses. At step 102, a header is added to the data packet including X-bit network addresses (e.g., X-bit source and destination network addresses). At Step 104, the data packet is transmitted to a local virtual tunnel gateway on the local first network. The local virtual tunnel gateway adds a virtual tunnel header with a Y-bit network addresses to the data packet and transmits the data packet to the second network device on the remote second network over a remote virtual tunnel via the third network that uses Y-bit network addresses.

A remote virtual tunnel gateway on the remote second network receives the data packet including the tunnel header with the Y-bit network addresses. The remote virtual tunnel header removes the tunnel header. The data packet is transmitted to the second network device using the X-bit network addresses in the data packet since the remote second network uses X-bit network addresses for data packets.

If the data packet will use is not an X-bit network address at Step 98 of FIG. 5A, at Step 106 of FIG. 5B a second portion of the dual protocol stack is selected with networking protocols using Y-bit network addresses. At step 108 a header is added to the data packet including Y-bit network addresses (e.g., Y-bit source and destination addresses). Step 108 may also include allocating a Y-bit DNAT/RSIP address that is added to the header. At Step 110, a virtual tunnel header with a X-bit addresses is added to the data packet. At Step 112, the data packet is transmitted to a local virtual tunnel gateway via a local virtual tunnel using the X-bit network addresses in the virtual tunnel header. At Step 114 the X-bit tunnel header is removed on the local virtual tunnel gateway. At Step 116, the data packet is transmitted from the local virtual tunnel gateway on the local first network to the remote second network over the third network using the Y-bit network addresses in the data packet.

The remote virtual tunnel gateway on the remote second network receives the data packet with Y-bit network addresses. The remote virtual gateway adds a tunnel header with X-bit network addresses. The data packet is transmitted to the second network device on the remote second network using the X-bit network addresses since the remote second network uses X-bit network addresses for data packets and the original data packet includes Y-bit network addresses.

In one exemplary preferred embodiment of the present invention Method 94 is used with exemplary dual utilization system network 68. However, the present invention is not limited to such an embodiment, and other embodiments can also be used.

In such an exemplary embodiment in FIG. 5A at Step 96, a data packet is received on a dual protocol stack 86 on a first network device 78 on a IPv4/IPv6 dual stack subnet 76 for a second network device 82 on a remote second network. The remote second network is a IPv6 only subnet 74 or IPv4/IPv6 dual stack subnet 76'. The exemplary embodiment is illustrated only with respect to the remote IPv4/IPv6 dual stack subnet 76'. However, the remote second network can also be the IPv6 only subnet 74. The local IPv4/IPv6 subnet 76 uses 128-bit IPv6 addresses for local network addresses. The remote IPv4/IPv6 subnet 76' also uses 128-bit IPv6 addresses for local network addresses. The local dual stack IPv4/IPv6 subnet 76 is connected to the remote IPv4/IPv6 subnet 76' by an IPv4 Internet backbone 70 that uses 32-bit IPv4 addresses.

At Step 98, a test is conducted from the dual protocol stack 86 to determine whether the data packet will use 128-bit IPv6 addresses. If the data packet will use 128-bit IPv6 addresses, at Step 100 a first portion of the dual protocol stack 86 with IPv6 protocols (e.g., 88, 90, 92) is selected. At step 102, a header is added to the data packet including 128-bit IPv6 source and destination addresses. At Step 104, the data packet with 128-bit IPv6 addresses is transmitted to a local virtual tunnel gateway 80 on the local dual stack IPv4/IPv6 subnet 76 using the 128-bit IPv6 addresses. The local virtual tunnel gateway 80 adds a virtual tunnel header with 32-bit IPv4 source and destination addresses by calling the IPv4 portion of the dual protocol stack 86. The virtual tunnel gateway 80 transmits the data packet to the second network device 82 on the remote IPv4/IPv6 subnet 76' over a remote virtual tunnel via the IPv4 Internet backbone 70 that uses 32-bit IPv4 addresses. On the remote IPv4/IPv6 subnet 76', a remote virtual tunnel gateway 84 removes the 32-bit IPv4 tunnel header and transmits the data packet to the remote second network device 82 using the original 128-bit IPv6 network addresses.

Figure 6:
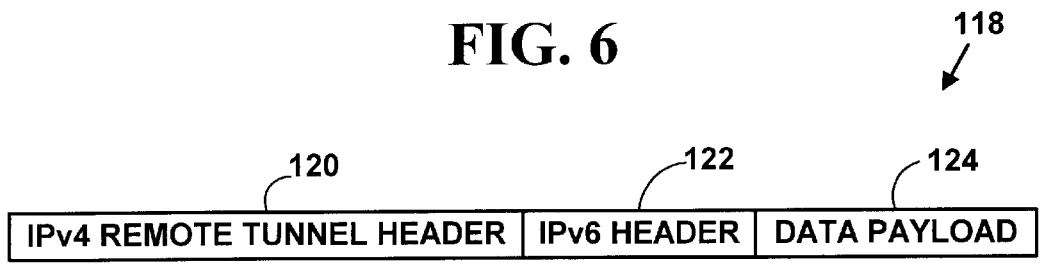
FIG. 6 is a block diagram illustrating an exemplary X-bit to Y-bit network address data packet.

FIG. 6 is a block diagram illustrating an exemplary X-bit to Y-bit network address data packet 118 transmitted at Step 104. The data packet 118 includes a remote virtual tunnel header 120 with a 32-bit IPv4 addresses, a header 122 with 128-bit IPv6 addresses and a data payload 124.

If the data packet will not use an X-bit network address at Step 98 of FIG. 5A, at Step 106 of FIG. 5B a second portion of the dual protocol stack 86 with IPv4 protocols (e.g., 50, 52, 54) is selected. In one exemplary preferred embodiment of the present invention, the 32-bit IPv4 address is a "normal" IPv4 address. In another exemplary preferred embodiment of the present invention, the 32-bit IPv4 address is a DNAT/RSIP IPv4 combination network address.

As was discussed above, the DNAT/RSIP combination network address includes a locally unique port and a common external network address (e.g., an IPv4 address) used for DNAT/RSIP. The DNAT/RSIP IPv4 combination network address allows a subnet to use a larger number of private network addresses behind a smaller number of public network addresses. Step 108 may also include allocating 32-bit IPv4 DNAT/RSIP addresses that are added to the header.

At step 108, a header is added to the data packet including a 32-bit IPv4 source and destination network address. At Step 110, a local virtual tunnel header with a 128-bit IPv6 source and destination addresses is added to the data packet from the IPv4 portion of the dual protocol stack 86 by calling the IPv6 portion of the dual protocol stack 86. At Step 112, the data packet is transmitted to the local virtual tunnel gateway 80 via a local virtual tunnel using the 128-bit IPv6 addresses in the virtual tunnel header since the local IPv4/IPv6 subnet 76 uses 128-bit IPv6 addresses. At Step 114, the 128-bit IPv6 tunnel header is removed on the local virtual tunnel gateway 80. At Step 116, the data packet is transmitted from the virtual tunnel gateway 80 to the second network device 82 on remote second network 76' over the IPv4 Internet backbone using the 32-bit IPv4 addresses in the data packet.

On the remote IPv6/IPv6 subnet 76', the remote virtual tunnel gateway 84 adds a tunnel header with a 128-bit IPv6 source and destination address to the data packet and transmits the data packet to the second network device 82 since the remote IPv4/IPv6 subnet 76' uses 128-bit network addresses for data packets and the original data packet includes a 32-bit IPv4 network address. The remote virtual tunnel gateway 84 may also use DNAT/RSIP on the data packet to identify the second network device and route the data packet to the second network device.

Figure 7:
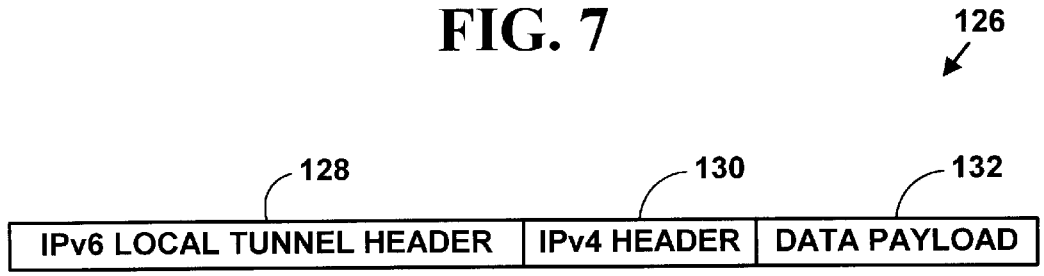
FIG. 7 is a block diagram illustrating an exemplary Y-bit to X-bit network address data packet.

FIG. 7 is a block diagram illustrating an exemplary Y-bit to X-bit network address data packet 126 transmitted at Step 104. The data packet 126 includes a remote virtual tunnel header 128 with a 128-bit IPv6 addresses, a header 130 with 32-bit IPv4 addresses and a data payload 132.

The methods and system described herein may help the transition from IPv4 to IPv6 networks. Dual address allocation is provided with a dual protocol stack that allows network devices to communicate with legacy IPv4 networks while using IPv6 for local communications on a IPv6 subnet. IPv6 over IPv4 remote virtual tunnels may be used to allow network devices using IPv6 network addresses on a local IPv6 subnet to communicate with remote IPv6 subnets over IPv4 public subnets. IPv4 over IPv6 local virtual tunnels may be used to allow network devices to using IPv4 network addresses on a local IPv6 subnet to communicate with remote IPv4 public subnets. The IPv4 addresses allocated may include IPv4 addresses used for the Distributed Network Address protocol Translation and/or the Realm Specific Internet Protocol.

It should be understood that the programs, processes, methods, systems and/or apparatus described herein are not related or limited to any particular type of computer apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used and visa-versa.

In view of the wide variety of embodiments to which the principles of the invention can be applied, it should be understood that the illustrative embodiments are exemplary only, and should not be taken as limiting the scope of the present invention. For example, the steps of the flow diagrams may be taken in sequences other than those described, and more or fewer elements or component may be used in the block diagrams. The claims should not be read as limited to the described order or elements unless stated to that effect. Therefore, all embodiments that come within the scope and spirit of the following claims and equivalents thereto are claimed as the invention.

We claim:

1. A method for dual network address utilization, comprising the steps of:

receiving an data packet in a dual protocol stack on a first network device on a local first network for a second network device on a remote second network, wherein the local first network uses X-bit network addresses, the remote second network uses X-bit network addresses and the local first network is connected to the remote second network by a third network that uses Y-bit network addresses;

determining from the dual protocol stack whether the data packet will use an X-bit network address, and if so, selecting a first portion of the dual protocol stack including networking protocols using X-bit network addresses, adding a header with an X-bit network addresses to the data packet, transmitting the data packet to a local virtual tunnel gateway on the local first network using the X-bit network addresses, wherein the local virtual tunnel gateway adds a remote virtual tunnel header with Y-bit network addresses and transmits the data packet to the second network device on the remote second network over a remote virtual tunnel via the third network that uses Y-bit network addresses;

determining from the dual protocol stack whether the data packet will use an X-bit network addresses, and if not, selecting a second portion of the dual protocol stack including networking protocols using Y-bit network addresses, adding a header with a Y-bit addresses to the data packet, adding a local virtual tunnel header with X-bit network addresses to the data packet, transmitting the data packet to the virtual tunnel gateway over a local virtual tunnel using the X-bit network addresses in the virtual tunnel header, removing the X-bit tunnel header on the local virtual tunnel gateway, and transmitting the data packet from the local virtual tunnel gateway on the local first network to the second network device on the remote second network over the third network using the Y-bit network addresses in the data packet.

2. The method of claim 1 wherein the third network includes an Internet Protocol version-4 network.

3. The method of claim 2 wherein the third network is the Internet.

4. The method of claim 1 wherein the Y-bit network address includes any of a Y-bit Distributed Network Address Translation or a Realm Specific Internet Protocol network address.

5. The method of claim 4 wherein the Y-bit network address includes a combination network address including a common public Internet Protocol version-4 address and a locally unique port used for Distributed Network Address Translation or Realm Specific Internet Protocol to uniquely identify the first network device.

6. A computer readable medium have stored therein instructions for causing a central processing unit to execute the method of claim 1.

7. The method of claim 1 wherein the local first network and the remote second network include any of Internet Protocol version-6 subnets or dual Internet Protocol version-4/Internet Protocol version-6 subnets.

8. The method of claim 1 wherein the X-bit network address includes a 128-bit Internet Protocol version-6 network address and the Y-bit network address includes a 32-bit Internet Protocol version-4 network address.

9. The method of claim 1 wherein the first portion of the protocol stack includes an Internet Protocol version-6 portion of the protocol stack and the second portion of the protocol stack is an Internet Protocol version-4 portion of the protocol stack.

10. The method of claim 1 wherein the first network device and the second network device include any of a computer, printer, personal digital assistant or telephone.

11. The method of claim 1 further comprising:
   receiving a data packet on a remote virtual tunnel gateway on the remote second network with a virtual tunnel header including Y-bit network addresses;
   removing the virtual tunnel header on the remote virtual tunnel gateway;
   transmitting the data packet to the second network device using X-bit network addresses from a header in the data packet, wherein the remote second network uses X-bit network addresses for data packets.

12. The method of claim 1 further comprising:
   receiving the data packet with a header including Y-bit network addresses on a remote virtual tunnel gateway on the remote second network;
   adding a virtual tunnel header with X-bit network addresses to the data packet on the remote virtual tunnel gateway;
   transmitting the data packet to the second network device using the X-bit network addresses in the tunnel header, wherein the remote second network uses X-bit network addresses for data packets and the data packet includes a header with Y-bit network addresses.

13. The method of claim 1 wherein the networking protocols of the dual protocol stack include any of Internet Protocol version-4 or Internet Protocol version-6.

14. A dual network address utilization system, comprising in combination:
   a dual protocol stack, wherein the dual protocol stack includes a first portion for networking protocols using X-bit network addresses and a second portion for networking protocols using Y-bit network addresses;
   a plurality of network devices including the dual protocol stack;
   a local network using X-bit network addresses;
   a remote network using X-bit network addresses;
   an intermediate network using Y-bit network addresses;
   a virtual tunnel gateway for adding a remote tunnel header for a remote virtual tunnel for a data packet with a header including X-bit network addresses sent from a local network device on a local network using X-bit network addresses across an intermediate network using Y-bit network addresses to a remote network device on a remote network using X-bit network addresses for removing a local tunnel header including X-bit network addresses for a data packet with a header including Y-bit network addresses, and for transmitting the data packet with the header including Y-bit network address across the intermediate network using Y-bit network addresses.

15. The system of claim 14 wherein the Y-bit network address includes any of a Y-bit Distributed Network Address Translation or a Realm Specific Internet Protocol network address.

16. The system of claim 15 wherein the Y-bit network address includes a combination network address including a common public Internet Protocol version-4 address and a locally unique port used for Distributed Network Address Translation or Realm Specific Internet Protocol to uniquely identify the first network device.

17. The system of claim 14 wherein the X-bit network address is a 128-bit Internet Protocol version-6 network address and the Y-bit network address is a 32-bit Internet Protocol version-4 network address.

18. The system of claim 14 wherein the plurality of network devices include any of a computers, printers, personal digital assistants or telephones.

19. A method for dual network address utilization, comprising the steps of:
   receiving an data packet in a dual Internet Protocol stack on a first network device on a local Internet Protocol network for a second network device on a remote Internet Protocol network, wherein the local Internet Protocol network uses 128-bit Internet Protocol version-6 addresses, the remote second network uses 128-bit Internet Protocol Network addresses and the local Internet Protocol network is connected to the remote Internet Protocol network by a third Internet Protocol network that uses 32-bit Internet Protocol addresses;
   determining from the dual Internet Protocol stack whether the data packet will use a 128-bit Internet Protocol version-6 address, and if so,
   selecting a first portion of the dual Internet Protocol stack using 128-bit Internet Protocol version-6 addresses,
   adding a header to the data packet including a 128-bit Internet Protocol version-6 network addresses,
   transmitting the data packet to a local virtual tunnel gateway on the local Internet Protocol network using the header with 128-bit Internet Protocol version-6 network addresses, wherein the local virtual tunnel gateway adds a remote virtual tunnel header including 32-bit Internet Protocol version-4 network addresses and transmits the data packet to the second network-device on the remote Internet Protocol network over a remote virtual tunnel via the third Internet Protocol network that uses 32-bit Internet Protocol version-4 addresses;
   determining from the dual Internet Protocol stack whether the data packet will use a 128-bit Internet Protocol version-6 address, and if not,
   selecting a second portion of the dual Internet Protocol stack using 32-bit Internet Protocol version-4 addresses,
   adding a header to the data packet including 32-bit Internet Protocol version-4 network addresses,
   adding a virtual tunnel header to the data packet including 128-bit Internet Protocol version-6 network addresses, transmitting the data packet in a local virtual tunnel to the local virtual tunnel gateway using the 128-bit Internet Protocol addresses version-6 in the virtual tunnel header, removing the virtual tunnel header with the 128-bit Internet Protocol addresses version-6 on the local virtual tunnel gateway, and transmitting the data packet from the local virtual tunnel gateway on the local Internet Protocol network to the second network device on the remote Internet Protocol network over the third Internet Protocol network using the 32-bit Internet Protocol version-4 addresses in the data packet.

20. The method of claim 19 wherein the 32-bit Internet Protocol network address includes any of a 32-bit Internet Protocol version-4 Distributed Network Address Translation network address or a Realm Specific Internet Protocol network address.

21. The method of claim 20 wherein the 32-bit Internet Protocol network address includes a combination network address with a common public Internet Protocol version-4 address and a locally unique port used for Distributed Network Address Translation or Realm Specific Internet Protocol to uniquely identify the first network device.

22. A computer readable medium have stored therein instructions for causing a central processing unit to execute the method of claim 19.

23. The method of claim 19 wherein the third Internet Protocol Network is the Internet.

24. The method of claim 19 wherein the local Internet Protocol network and the remote Internet Protocol network include dual Internet Protocol version-4/Internet Protocol version-6 subnets.

* * * * *